(12) United States Patent
Shimomura et al.

(10) Patent No.: US 9,542,720 B2
(45) Date of Patent: Jan. 10, 2017

(54) TERMINAL DEVICE, IMAGE DISPLAY METHOD, AND STORAGE MEDIUM

(71) Applicant: SONY MOBILE COMMUNICATIONS INC., Tokyo (JP)

(72) Inventors: Akihiro Shimomura, Tokyo (JP); Yuka Jingushi, Tokyo (JP); Hidehiro Komatsu, Tokyo (JP); Akira Nishiyama, Tokyo (JP); Noribumi Shibayama, Tokyo (JP); Ryoko Amano, Tokyo (JP); Miyuki Shirakawa, Tokyo (JP); Kazuya Takeuchi, Tokyo (JP); Takeshi Tanigawa, Tokyo (JP); Daichi Yagi, Tokyo (JP); Yasuhiro Yoshioka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 73 days.

(21) Appl. No.: 14/052,385

(22) Filed: Oct. 11, 2013

(65) Prior Publication Data

US 2014/0104319 A1 Apr. 17, 2014

Related U.S. Application Data

(60) Provisional application No. 61/713,124, filed on Oct. 12, 2012.

(51) Int. Cl.
*G09G 5/00* (2006.01)
*G06T 3/40* (2006.01)
*G06T 11/60* (2006.01)

(52) U.S. Cl.
CPC ........ *G06T 3/40* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,680,749 B1 * | 1/2004 | Anderson et al. | 348/231.99 |
| 8,494,306 B2 * | 7/2013 | Sorek | G06T 5/50 345/629 |
| 8,823,836 B2 * | 9/2014 | Park | 348/239 |
| 2002/0196357 A1 * | 12/2002 | Battles | H04N 1/0044 348/333.01 |
| 2008/0307307 A1 * | 12/2008 | Ciudad et al. | 715/719 |
| 2009/0195515 A1 * | 8/2009 | Lee | G06F 3/04817 345/173 |
| 2010/0026842 A1 * | 2/2010 | Ishizaka | G06F 17/30781 348/231.2 |
| 2012/0081573 A1 * | 4/2012 | Park | 348/231.3 |

(Continued)

FOREIGN PATENT DOCUMENTS

JP 2008-140328 6/2008

*Primary Examiner* — M Good Johnson
(74) *Attorney, Agent, or Firm* — Oblon, McClelland, Maier & Neustadt, L.L.P.

(57) ABSTRACT

Captured or input image data is converted into an image of a size of a specific number of pixels. Then, predetermined plural types of different effects are applied to image data obtained through the conversion. Several types of image data items with the applied effects are arranged and simultaneously displayed.

17 Claims, 8 Drawing Sheets

(56) References Cited

U.S. PATENT DOCUMENTS

| | | | |
|---|---|---|---|
| 2013/0100329 A1* | 4/2013 | Kojima | H04N 5/23222 348/333.01 |
| 2014/0078343 A1* | 3/2014 | Dai | H04N 5/772 348/231.99 |

* cited by examiner

TERMINAL DEVICE, IMAGE DISPLAY METHOD, AND STORAGE MEDIUM

CROSS REFERENCE TO RELATED APPLICATIONS

The present application claims the benefit of the earlier filing date of U.S. provisional application 61/713,124 having common inventorship with the present application and filed in the U.S. Patent and Trademark Office on Oct. 12, 2012, the entire contents of which being incorporated herein by reference.

TECHNICAL FIELD

The present disclosure relates to a terminal device displaying an image, and an image display method applied to the terminal device, and a storage medium storing a program executing the image display method.

BACKGROUND ART

Various types of terminal devices such as a mobile phone terminal device including an imaging unit have become widely available. For example, mobile phone terminal devices referred to as smartphones in which various types of application programs may be installed and which include an imaging unit have become widely available. Installing an image-editing application program in the smartphone allows various types of effect processes to be performed on an image that is captured and obtained by the imaging unit, and allows the image to be stored.

Patent Literature 1 describes that, in a mobile phone terminal device including an imaging unit, effect processing is performed on a captured and obtained image, and the image subjected to the effect processing is stored in a memory or the like.

CITATION LIST

Patent Literature

[PTL 1] Japanese Unexamined Patent Application Publication No. 2008-140328

SUMMARY OF INVENTION

As described above, image editing achieved through the use of the image-editing application program installed in the terminal device is usually performed to edit an image that is captured by the imaging unit and stored. Therefore, the editing and the imaging cannot be performed at the same time. Even if the imaging and the effect-apply processing may be performed at the same time, only a predetermined single type of effect process is performed. For example, settings are made by a user so that a captured color image is converted into an image of a specific color such as a monochrome image and stored, which causes an image processing unit provided in the terminal device to perform an effect process so that a captured and obtained image is converted into the image of the specific color. Here, for switching over to an effect process different from the process performed to obtain the specific color image, the user needs to perform an operation to change the mode of performing effect processing by referring to a menu screen image or the like.

The present inventor recognized the benefit of allowing plural effect processes to be performed on an image with ease.

A terminal device according to the present disclosure includes processing circuitry configured to
convert captured image data into converted image data of an image of a size of a specific number of pixels, and
apply predetermined plural types of different effects to the converted image data; and
a display configured to arrange and simultaneously display plural types of image data items corresponding to the plural types of different effects applied to the converted image data by the processing circuitry.

An image display method according to the present disclosure includes
converting captured image data into converted image data of an image of a size of a specific number of pixels;
applying via processing circuitry predetermined plural types of different effects to the converted image data; and
displaying simultaneously on a display unit plural types of image data items corresponding to the plural types of different effects applied to the converted image data.

A non-transitory storage medium according to the present disclosure contains computer readable instructions that when executed by processing circuitry perform a method, the method includes
converting captured image data into converted image data of an image of a size of a specific number of pixels;
applying via processing circuitry predetermined plural types of different effects to the converted image data; and
displaying simultaneously on a display unit plural types of image data items corresponding to the plural types of different effects applied to the converted image data.

The present disclosure allows images with applied different effects to be arranged and displayed.

DESCRIPTION OF EMBODIMENTS

An embodiment of the present disclosure will be described in the following order with reference to FIG. 1 to FIG. 8.

1. Exemplary configuration of terminal device (FIG. 1 and FIG. 2)
2. Exemplary process performed in terminal device (FIG. 3 to FIG. 5)
3. Description of display process (FIG. 6)
4. Description when storing image (FIG. 7)
5. Flow of process performed for each frame and process performed when storing image (FIG. 8)
6. Exemplary modifications

[1. Exemplary Configuration of Terminal Device]

Figure 1:
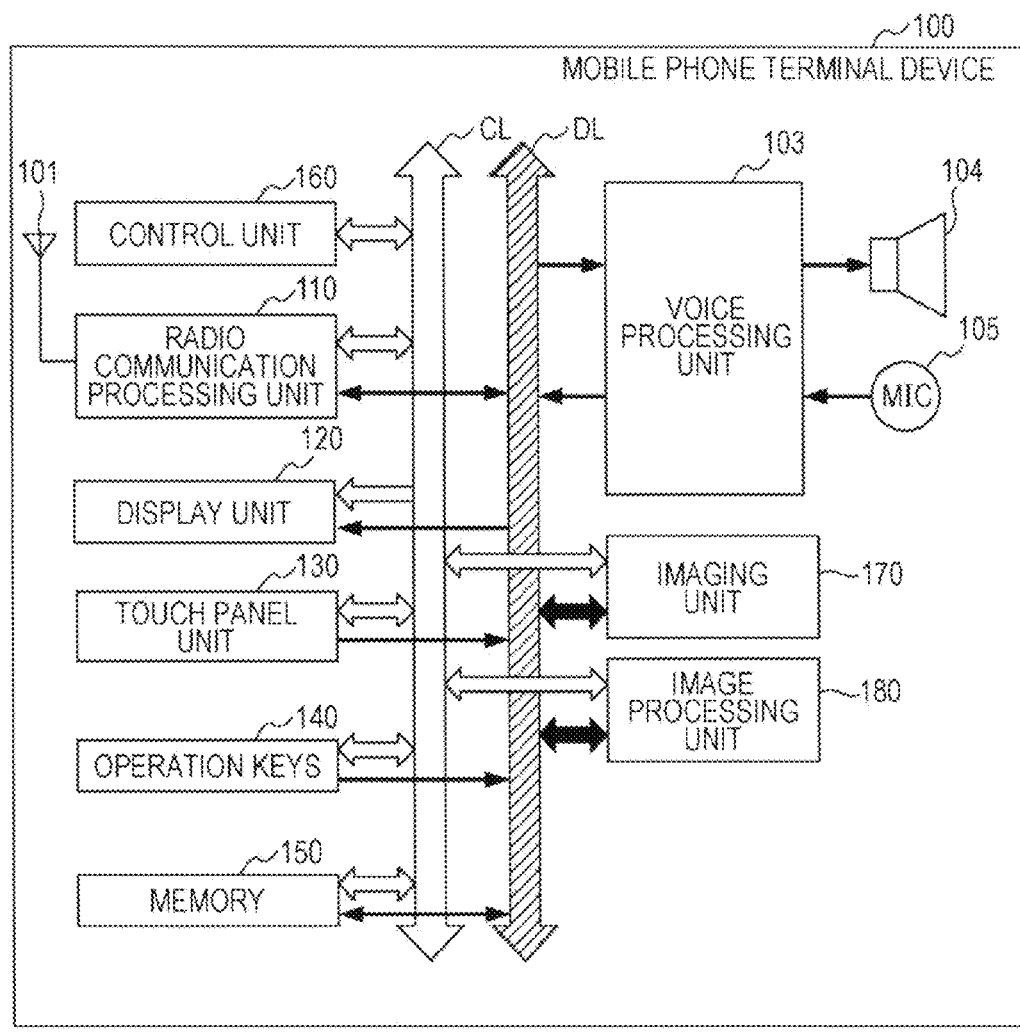
FIG. 1 is a block diagram illustrating an exemplary configuration of a terminal device according to an embodiment of the present disclosure.

FIG. 1 is a diagram illustrating the configuration of a mobile phone terminal device 100 of the present disclosure.

The mobile phone terminal device 100 includes an antenna 101 for radio communication with a radio-telephone base station. The antenna 101 is connected to a radio communication processing unit 110. The radio communication processing unit 110 performs a process to transmit and receive a radio signal under control of a control unit 160. The control unit 160 (e.g., one or more microprocessors, ASICs, PALs, or other processing circuitry, whether contained in a single unit or distributed in multiple units) sends a control instruction to the radio communication processing unit 110 via a control line CL. The control unit 160 reads a program (software) stored in a memory 150, and executes the program to control each unit of the mobile phone terminal device 100. In the memory 150 provided in the mobile phone terminal device 100, data prepared in advance such as a program is stored and data generated based on a user operation is stored.

At the voice-conversation, voice data for conversation, which is received by the radio communication processing unit 110, is supplied to a voice processing unit 103 via a data line DL. The voice processing unit 103 performs a demodulation process for the supplied voice data, and obtains an analog voice signal. The analog voice signal obtained by the voice processing unit 103 is supplied to a speaker 104, and a voice is output from the speaker 104.

Further, a voice signal output from a microphone 105 is supplied to the voice processing unit 103 at the voice conversation. The voice signal is converted into voice data of a transmission format by the voice processing unit 103. Then, the voice data converted by the voice processing unit 103 is supplied to the radio communication processing unit 110 via the data line DL. Further, the voice data supplied to the radio communication processing unit 110 is packetized and transmitted wirelessly.

When performing data communications or the transmission/reception of a mail via a network such as the Internet, the radio communication processing unit 110 performs a process of transmission/reception under control of the control unit 160. For example, data received by the radio communication processing unit 110 is stored in the memory 150, and a display process is performed based on the stored data by the control of the control unit 160. Further, the data stored in the memory 150 is supplied to the radio communication processing unit 110 and transmitted wirelessly.

Note that, the mobile phone terminal device 100 may include a radio communication processing unit separated from the radio communication processing unit 110 performing radio-telephone communications. For example, the mobile phone terminal device 100 may include a radio communication processing unit provided for a wireless LAN (Local Area Network) and perform data communications via the wireless LAN, or the like.

The mobile phone terminal device 100 includes a display unit 120. The display unit 120 displays images or various types of information on a display panel 121 (FIG. 2) under control of the control unit 160. As the display panel 121 provided for the display unit 120, for example, a liquid crystal display panel or an organic EL (Electro-Luminescence) display panel is used. The display unit 120 also displays an image captured by an imaging unit 170 which will be described later.

Further, the mobile phone terminal device 100 includes a touch panel unit 130. When the surface of the display panel 121 is touched by an object such as a finger or a pen, the touch panel unit 130 detects the touched position.

The touch panel unit 130 includes, for example, a capacitance touch panel that detects the touch of a finger or the like based on the capacitance change. Data about the touched position detected by the touch panel unit 130 is sent to the control unit 160 that executes a running application based on the supplied touched position data.

Further, the mobile phone terminal device 100 includes operation keys 140. The operation information of the operation keys 140 is sent to the control unit 160. Note that, most operations of the mobile phone terminal device 100 are performed based on a touch panel operation achieved by using the touch panel unit 130, and the operation keys 140 only perform part of the operations. The mobile phone terminal device 100 includes a shutter key 141 (FIG. 2) which will be described later as one of the operation keys 140.

Further, the mobile phone terminal device 100 includes the imaging unit 170 (that includes optics and a CCD, CMOS or other sensor) that captures a moving image or a still image under control of the control unit 160. The imaging unit 170 includes a lens 171 (FIG. 2) capable of performing focus adjustment.

Image data that is captured and obtained by the imaging unit 170 is supplied to an image processing unit 180 (e.g., one or more microprocessors, ASICs, PALs, or other processing circuitry, whether contained in a single unit or distributed in multiple units), and subjected to various types of imaging processes in the image processing unit 180. Effect processes which will be described later are also performed by the image processing unit 180.

Image data subjected to processing performed by the image processing unit 180 is supplied to the display unit 120 for display. Further, when storing a captured image based on an operation of the shutter key 141, which is performed by a user, image data subjected to processing performed by the image processing unit 180 is supplied to the memory 150. Then, the memory 150 stores the supplied image data.

Figure 2:
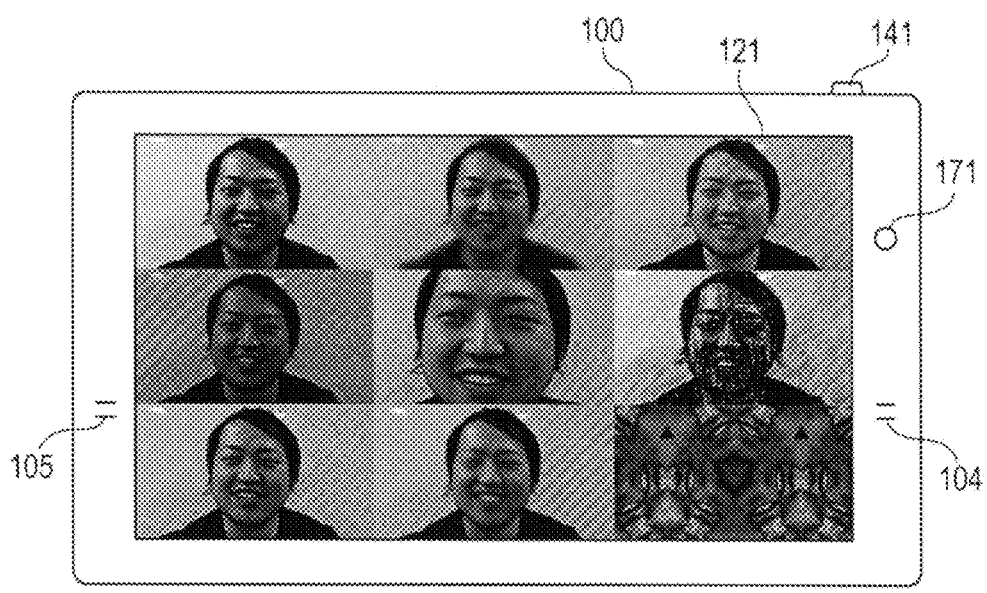
FIG. 2 is a diagram illustrating an exemplary shape of a terminal device according to an embodiment of the present disclosure.

FIG. 2 is a diagram illustrating an exemplary shape of the mobile phone terminal device 100.

The mobile phone terminal device 100 includes the display panel 121 which is relatively large in size. A conversation speaker 104 and a microphone 105 are provided at a side of the display panel 121. Further, a lens 171 included in the imaging unit 170 is provided at a side of the display panel 121.

In addition, FIG. 2 illustrates an example where the lens 171 of the imaging unit 170 is provided on a face of a housing, where the display panel 121 is provided. However, the lens 171 may be provided on a face (back face) opposite to the face where the display panel 121 is provided. Otherwise, different lenses may be provided on both the face where the display panel 121 is provided and the back face, respectively.

In the example of FIG. 2, an example where the display panel 121 of the mobile phone terminal device 100 arranges and displays nine images that are obtained by applying nine types of different effects to a single image (face) captured by the imaging unit 170. The details of processing performed to apply the nine types of different effects will be described with reference to FIG. 3 and subsequent figures.

[2. Exemplary Process Performed in Terminal Device]

Figure 3:
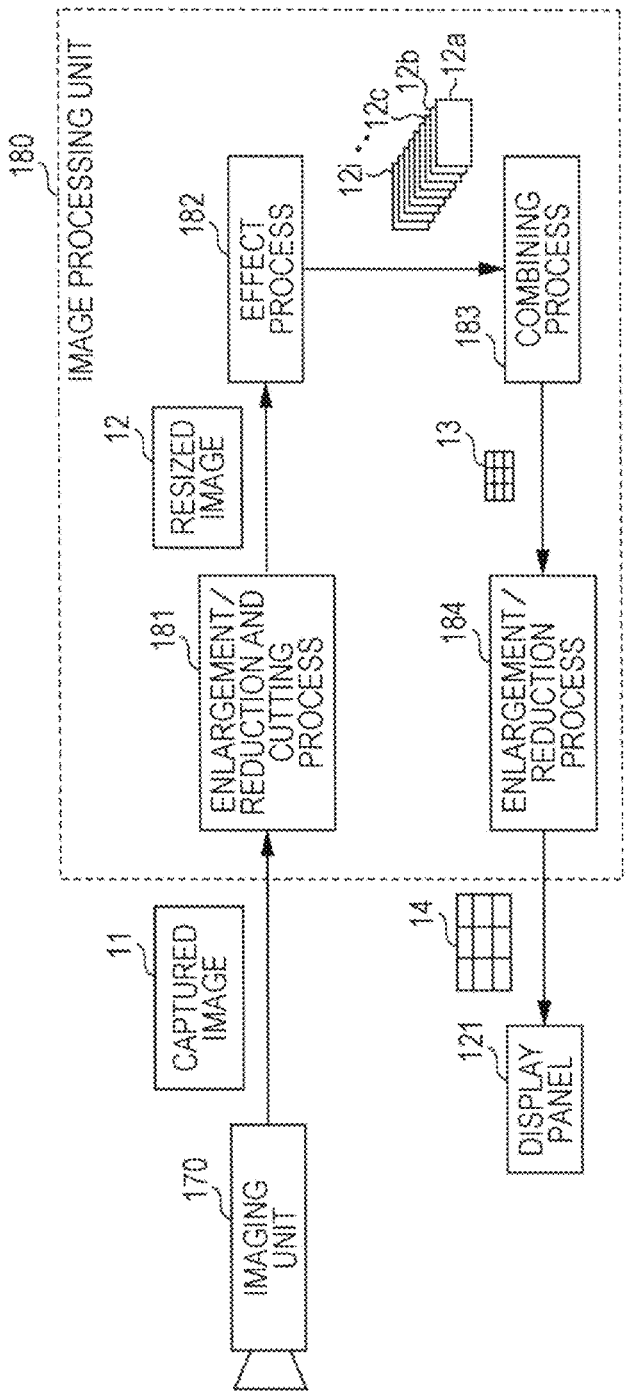
FIG. 3 is a functional block diagram illustrating an exemplary process performed by a terminal device according to an embodiment of the present disclosure.

FIG. 3 is a diagram illustrating the details of processing performed to apply the nine types of effects to an image captured by the mobile phone terminal device 100.

A captured image 11 that is captured and obtained by the imaging unit 170 is supplied to the image processing unit 180. The imaging unit 170 outputs the captured image 11 for every single frame period (e.g., 1/30 second). The size of the captured image 11 is a size complying with an imaging mode set by the user. For example, the mobile phone terminal device 100 allows the user to desirably set image capturing performed in a relatively large size of 1920 pixels in width by 1080 pixels in length or the like, or image capturing performed in a relatively small size of 640 pixels in width by 480 pixels in length, or the like.

The image processing unit 180 performs an enlargement/reduction and cutting process 181, an effect process 182, an combining process 183, and an enlargement/reduction process 184 on the supplied captured image 11 in that order. Although the processes 181 to 184 may be provided by dedicated processing units (an image-size change unit, an effect processing unit, or the like, any or all of which can be executed by processing circuitry configured to perform the processes), respectively, the processes may be executed on processing circuitry through software, for example. When the processes are executed through software, the software is stored in the memory 150, for example, and read from the memory 150 and supplied to the image processing unit 180 by the control unit 160. The image processing unit 180 executes the above-described processes 181 to 184.

The processes 181 to 184 will be described. The enlargement/reduction and cutting process 181 is a process performed to enlarge or reduce the captured image 11 into a size of predetermined number of pixels. When cutting of the image is needed at that time, a trimming process is performed to cut the area around the center of the image. Through the enlargement/reduction and cutting process 181, a resized image 12 formed into the size of 640 pixels in width by 480 pixels in length is obtained.

The effect process 182 is a process performed to apply predetermined nine types of different effects to the single resized image 12. Specific examples of the nine types of effects will be described later. Through the effect process 182, the nine types of different effects are applied, and nine images 12a, 12b, ..., and 12i with the applied effects are obtained.

Through the combining process 183, the nine images 12a, 12b, ..., and 12i with the applied effects are combined into a single image including a 3-in-length by 3-in-width matrix of images, and a combined image 13 is obtained. Here, the size of each image is 640 pixels in width by 480 pixels in length. Therefore, the size of the combined image 13 becomes 1,920 pixels in width by 1,440 pixels in length.

Through the enlargement/reduction process 184, the size of the combined image 13 is enlarged or reduced in accordance with the size of an image displayed in the display panel 121, and a display image 14 is obtained. Here, the size of the display image 14 is supposed to be 1,280 pixels in width by 720 pixels in length.

The data of the display image 14 is supplied from the image processing unit 180 to the display unit 120, and nine effect images are displayed on the display panel 121.

Each of the processes 181 to 184 that are performed in the image processing unit 180 is a process performed during the single frame period, and processing performed to obtain the display image 14 from the captured image 11 captured by the imaging unit 170 is repeatedly executed for every single frame. Accordingly, the display panel 121 displays the imaging state of the imaging unit 170 in real time as moving images.

However, the image processing unit 180 may apply the effects to the nine images during the single frame period only when the size of the single image is a relatively small size, such as 640 pixels in width by 480 pixels in length as described above. In the case of handling an image of a relatively large size, such as 1,920 pixels in width by 1,080 pixels in length, the number of images to which the image processing unit 180 may apply effects during the single frame period is limited to one, for example, in accordance with the throughput of the image processing unit 180.

Figure 4A:
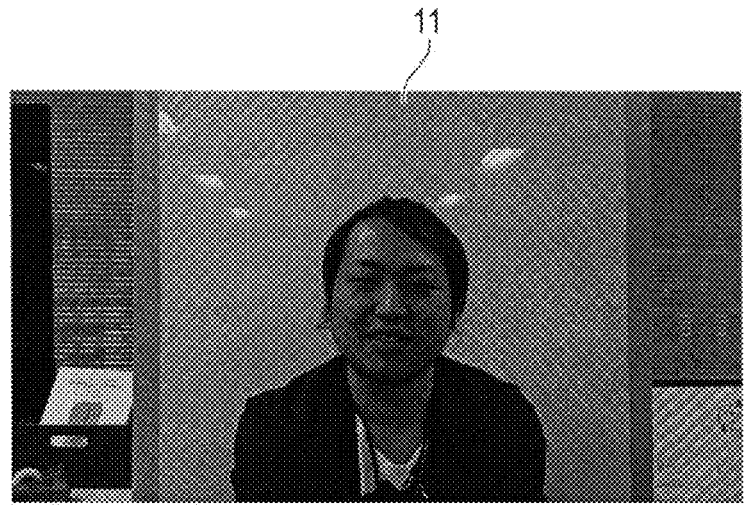
FIGS. 4A and 4B are diagrams illustrating exemplary images according to an embodiment of the present disclosure.
Figure 4B:
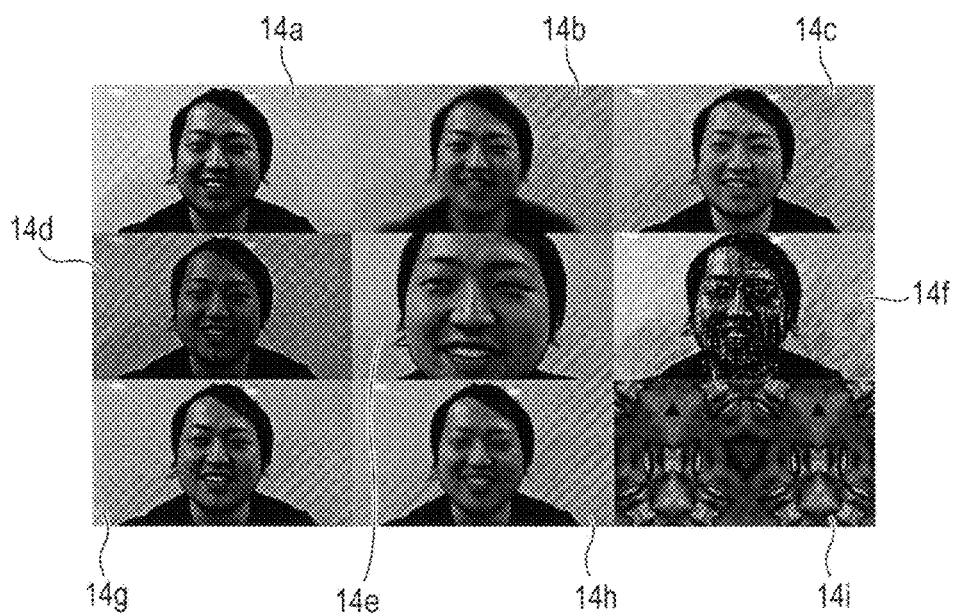

FIGS. 4A and 4B are diagrams illustrating an example of the display image 14.

The display image 14 illustrated in FIG. 4B is an image obtained by combining the nine images 12a, 12b, ..., and 12i with the applied effects, and enlarging or reducing the combined image. The display image 14 includes a matrix of images 14a, 14b, ..., and 14i that are subjected to nine different effect processes. In that example, the image processing unit 180 performs an effect process for the captured image 11 of a person's face illustrated in FIG. 4A. Effects concerning colors are applied to part of the images 14a to 14i that are illustrated in FIG. 4B as described next. Therefore, some of the effect-applied states may be unclear on the drawings illustrated in black and white.

Examples of the effects that are applied to the images 14a to 14i will be described. Note that each of the following effect names is an exemplary name indicating an effect, and a different name may be used to refer to the same image processing.

The image 14a is an image with an applied effect referred to as "nostalgia". The application of the effect "nostalgia" allows the color of the image to be changed into a color-faded state.

The image 14b is an image with an applied effect referred to as "miniature". The application of the effect "miniature" allows the surrounding part of the image to be in the out-of-focus state.

The image 14c is an image with an applied effect referred to as "vivid". The application of the effect "vivid" allows the colors of the image to be in an enhanced state.

The image 14d is an image with an applied effect referred to as "filter". The application of the effect "filter" allows the color image to be changed into a black-and-white or sepia-colored image.

The image 14e is an image with an applied effect referred to as "fish eye". The application of the effect "fish eye" allows the center part of the image to be enlarged and the surrounding part thereof to be reduced so that as though the image is taken with a fish-eye lens.

The image 14f is an image with an applied effect referred to as "sketch". The application of the effect "sketch" allows the image to be changed into an image with enhanced contours.

The image 14g is an image with an applied effect referred to as "part color". The application of the effect "part color" allows the image to be changed into an image in which the color of an area other than the area with a specific color is black and white.

The image 14h is an image with an applied effect referred to as "Harris shutter". The application of the effect "Harris shutter" allows the image to be changed into an image in which the primary color components thereof are shifted in some degree.

The image 14i is an image with an applied effect referred to as "kaleidoscope". The application of the effect "kaleidoscope" allows the image to be changed into an image in which a certain part thereof is extracted and arranged in many places as though the image is viewed through a kaleidoscope.

In addition, as to the effect "fish eye", the image 14e is acquired by cutting a square area around the center of a circular fish-eye image, and enlarging the cut image into a size of 640 pixels in width by 480 pixels in length.

As for the details of each effect process, settings may be made based on a user operation. For example, various effect process states including the specification of colors, which is performed to apply the effect "part color", the selection between a black-and-white image and a sepia image, which is made to apply the effect "filter", and so forth are set based on the user operation.

Further, the order in which the images 14a to 14i with the individual effects applied are arranged may also be changed based on the user operation. Further, settings may be made so that an image with another applied effect is arranged based on the user operation.

In the mobile phone terminal device 100 of the present disclosure, storage processing is performed for any one of the effect images or each of the nine effect images when a shutter operation is performed by the user in the state where the images 14a to 14i with the applied effects, which are illustrated in FIG. 4B, are displayed.

For example, the user touches any one of the images 14a to 14i that are shown on the display panel 121 through a touch operation, whereby the control unit 160 of the mobile phone terminal device 100 starts the storage processing at the time the touch operation is performed. At that time, the control unit 160 determines the image touched through the touch operation, and determines an effect applied to the determined image to be the effect of the stored image.

Further, when the screen of the display panel 121 is touched for a relatively long time, or when the shutter key 141 is pressed, the control unit 160 starts a process to store the nine images 14a to 14i at the same time. The details of the flow of the storage process will be described later.

Figure 5:
FIG. 5 is a diagram illustrating exemplary effects of images according to an embodiment of the present disclosure.

FIG. 5 is a diagram illustrating exemplary images to be stored in which a single type of effect is selected. In FIG. 5, four exemplary effects are illustrated.

An image 14E denotes an example where the image 14e with the effect "fish eye" is selected based on a user operation. In that case, the displayed image 14E is circular as though the image is taken with a fish-eye lens and the viewing angle is virtually determined to be 180°, and the image 14E is stored.

An image 14F denotes an example where the image 14f with the effect "sketch" is selected based on a user operation. In that case, the displayed image 14F includes enhanced contours as though the image is drawn in thick lines, and the image 14F is stored.

An image 14H denotes an example where the image 14h with the effect "Harris shutter" is selected based on a user operation. In that case, the primary color components of the displayed 14H are shifted laterally, for example, and the image 14H is stored.

An image 14I denotes an example where the image 14i with the effect "kaleidoscope" is selected based on a user operation. In that case, in the displayed image 14I, the area around the center of the original image is arranged in a radial pattern, and the image 14I is stored.

[3. Description of Display Process]

Next, exemplary processing performed to arrange and display images with applied nine types of effects will be described with reference to a flowchart of FIG. 6.

First, the image processing unit 180 captures a single frame of image, which is captured by the imaging unit 170 (step S11). Then, the image processing unit 180 determines whether or not any of conversion processes including the enlargement, the reduction, and the cutting of the image is needed (step S12). When the determination indicates that these conversion processes are needed, the image processing unit 180 performs the processing of enlargement or reduction and cutting, and obtains an image of a fixed size (640 pixels in width by 480 pixels in length) (step S13). When the image captured at step S11 is already of the fixed size, the image processing unit 180 does not perform the processing at step S13.

Then, when it is determined that the processes including the enlargement, the reduction, and the cutting are not needed at step S12, and after any of the processes is performed at step S13, the image processing unit 180 generates nine images with the applied nine types of effects from a single image of the fixed size (step S14). The nine images are combined into a single image in the image processing unit 180 (step S15).

Next, the image processing unit 180 confirms the size of the display screen of the display panel 121, and determines whether or not the enlargement or the reduction is needed to display the image obtained through the combining performed at step S15 on the display panel 121 (step S16). When the determination indicates that the enlargement or the reduction is needed, the image processing unit 180 enlarges or reduces the combined image in accordance with the size of the display screen of the display panel 121 (step S17).

Then, when it is determined that the enlargement or the reduction is not needed at step S16, and after any of the processes is performed at step S17, the combined image generated by the image processing unit 180 is supplied to the display unit 120, and displayed on the display panel 121 (step S18). At that time, the image displayed on the display panel 121 includes nine images with different effects applied as illustrated in FIG. 4B.

In the state where the image display is performed, the control unit 160 of the mobile phone terminal device 100 determines whether or not the touch panel unit 130 detects a touch on any of the images (step S19). Here, upon determining that no touch is made, the control unit 160 further determines whether or not the shutter key 141 is operated (step S20).

When it is determined that the touch operation is performed at step S19 and when it is determined that the shutter key 141 is operated at step S20, the control unit 160 proceeds to processing performed in storage mode (step S21). The processing performed in the storage mode will be described with reference to a flowchart of FIG. 7.

Then, upon determining that the shutter key is not operated at step S20, the control unit 160 determines whether or not the update of display is needed (step S22). Since the moving-image display is performed herein, the control unit 160 determines that the update of display is needed, and executes the processing again from step S11 when a single-frame period elapses since the image is captured at step S11.

Upon determining that the update of display is not needed at step S22, the control unit 160 ends the display processing performed for the images with the applied effects.

[4. Description when Storing Image]

Figure 6:
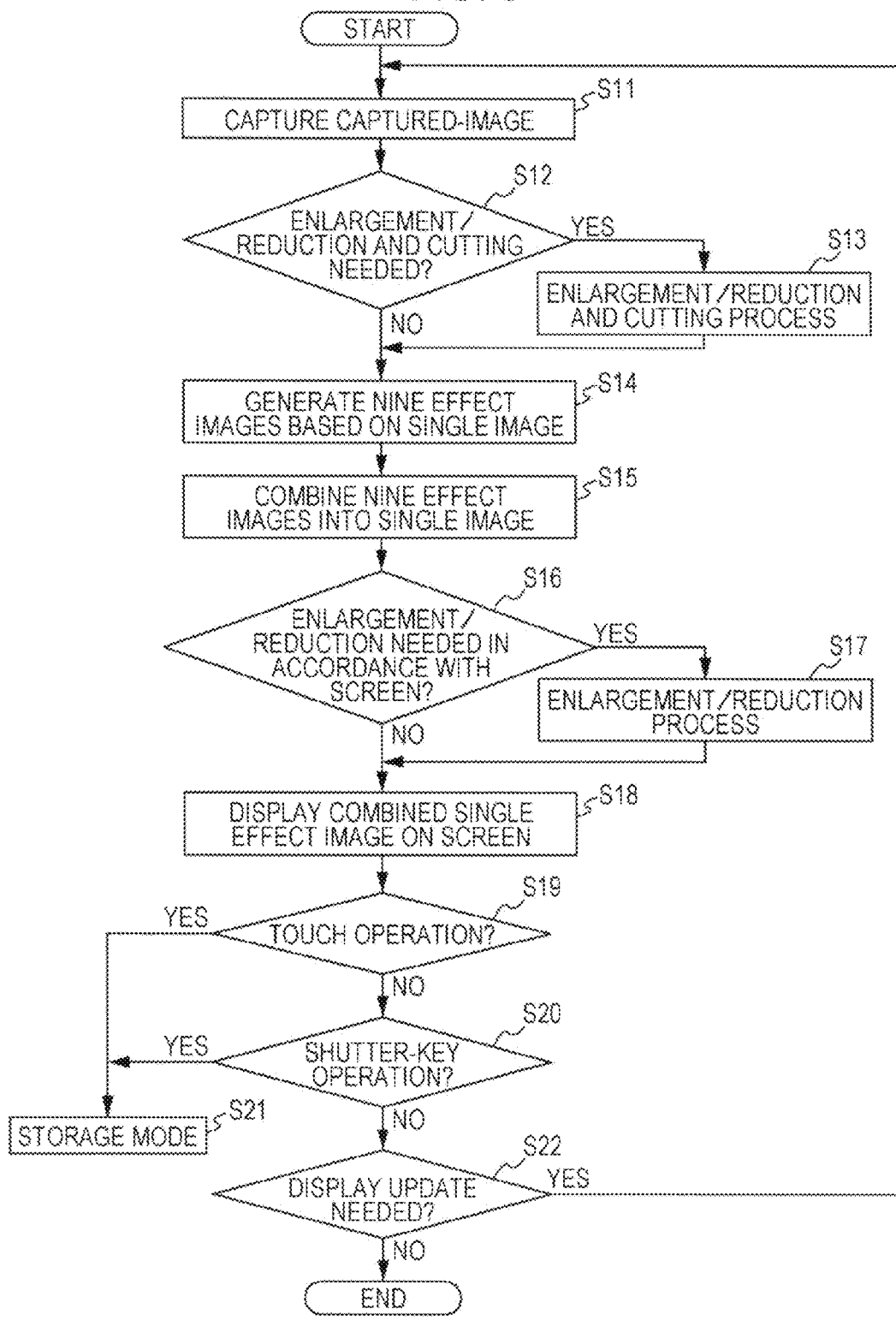
FIG. 6 is a flowchart illustrating an exemplary display process performed according to an embodiment of the present disclosure.
Figure 7:
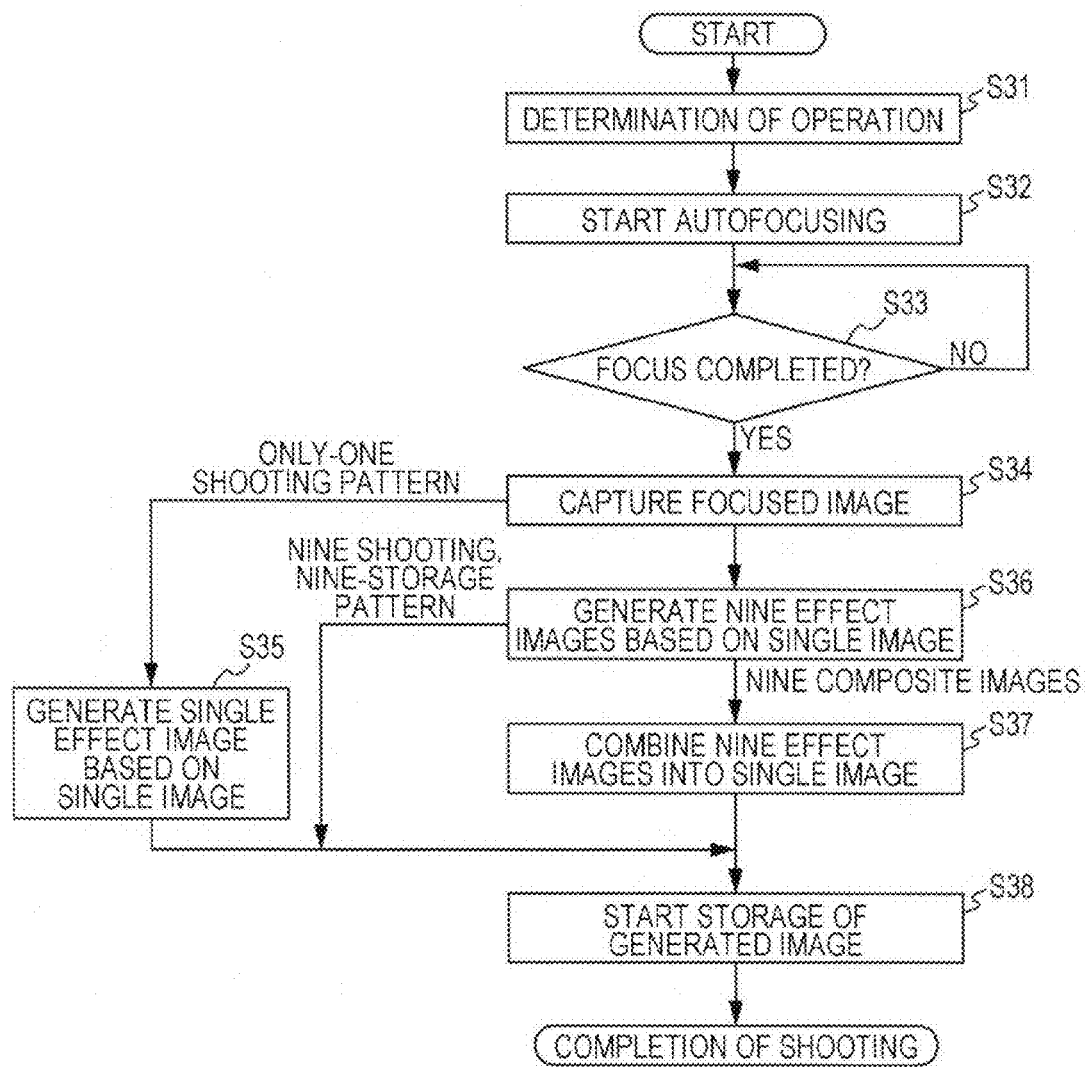
FIG. 7 is a flowchart illustrating an exemplary process performed when storing the image according to an embodiment of the present disclosure.

Flowchart of FIG. 7 illustrates exemplary processing performed when the control unit 160 starts the storage-mode processing at step S21 of the flowchart of FIG. 6.

First, the control unit 160 determines an operation relating to storage, which is performed by the user (step S31). Here, the control unit 160 discriminates between the touch-operation detection, which is performed at step S19 of the flowchart of FIG. 6, and the detection of the operation of the shutter key 141, which is performed at step S20. In that example, at the touch-operation, a one-storage mode is selected where a single touched image is stored in a size in which the single touched image is captured by the imaging unit 170. Further, at the shutter-key operation, a nine-storage mode is selected where nine combined images are stored in the sizes of displayed images. In the nine-storage mode, there are a case where a single image obtained by combining nine images is stored and a case where the nine images are respectively stored as different images. A selection between these combined-image storage and nine-image storage is made in advance based on a user operation, for example, so as to determine which storage is performed.

Returning to the description of the flowchart of FIG. 7, the control unit 160 determines a user operation, and causes the imaging unit 170 to start autofocus processing so that a subject shown in a captured image is brought into focus (step S32). Then, the control unit 160 determines whether or not a focused image is obtained through the autofocus processing (step S33). The time from the start of the autofocus processing to the focus is a relatively short time of less than a second, for example. However, the time varies in accordance with the performance of the imaging unit 170 or the state of the subject.

When it is determined that the focus is achieved at step S33, the image processing unit 180 captures a single frame of image, which is captured by the imaging unit 170 after the focus is achieved (step S34). Then, when the storage mode selected here is the one-storage mode, the image processing unit 180 applies an effect of the same type as that applied to the image selected through the touch operation to the single frame of image captured at step S34, and generates an image with the applied effect (step S35). The effect processing at step S35 is performed on the image of a size captured at step S34.

Further, when the storage mode is the nine-storage mode, the image processing unit 180 generates nine effect images to which the nine types of effects are individually applied to the single frame of image captured at step S34 (step S36). Here, when it is configured that the nine images are combined and stored, the image processing unit 180 combines the nine images with the applied effects to generate a single image (step S37). The effect processing at step S35 is performed on the image of the size captured at step S34. For acquiring the nine images that are subjected to the effect processing performed at step S36, the effect processing is performed on an image converted into a specific size such as 640 pixels in width by 480 pixels in length as described with reference to the flow of the process shown in FIG. 3.

Next, the processing proceeds to step S38, and the images that are generated at steps S35, S36, and S37 are stored in the memory 150. That is, when the single image with the applied effect is generated at step S35, the image is stored in the memory 150. Further, when the nine images with the applied effects are generated at step S36, the nine images with the applied effects are stored in the memory 150. Further, when the combined image with the applied effects is generated at step S37, the combined image with the applied effects is stored in the memory 150.

In addition, in the storage-mode, an image stored in the memory 150 is displayed by the display panel 121. Further, when the storage in the memory 150 is finished, the control unit 160 may return to the processing of step S11 of the flowchart of FIG. 6 to restart the display process for the nine images with the applied effects.

[5. Flow of Process Performed for Each Frame and Process Performed when Storing Image]

Figure 8:
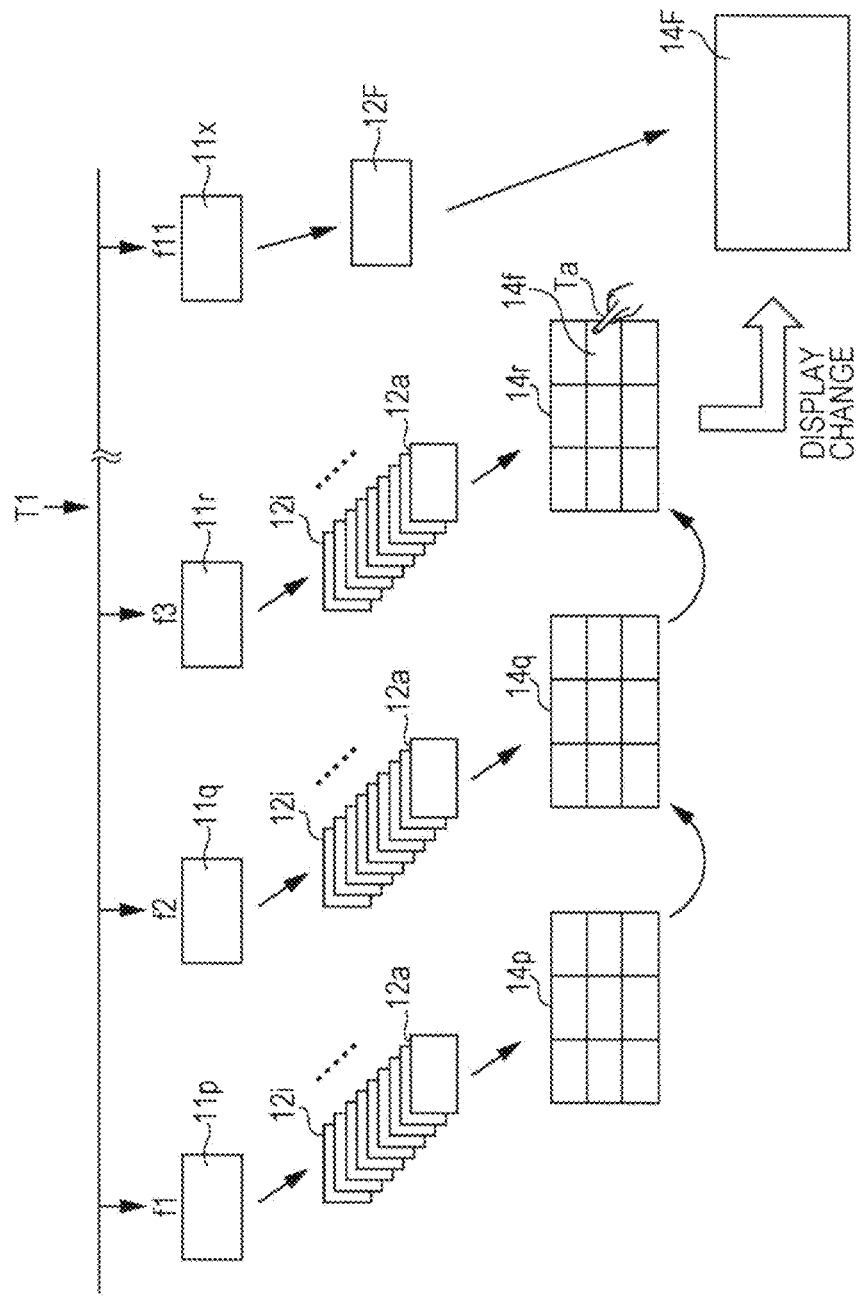
FIG. 8 is a diagram illustrating the flow of a process performed for each frame and a process performed when storing the image according to an embodiment of the present disclosure.

FIG. 8 is a diagram illustrating the flow of display processing performed for each frame and image storage processing.

For example, an image 11$p$ output from the imaging unit 170 during a first frame period f1 is supplied to the image processing unit 180, and the nine images 12$a$ to 12$i$ with the applied nine types of effects are generated. Then, an image 14$p$ generated by combining the nine images 12$a$ to 12$i$ is displayed on the display panel 121.

After that, captured images 11$q$ and 11$r$ are obtained during a second frame period f2, a third frame period f3 . . . , respectively, and nine images with the applied nine types of effects are generated individually for the images 11$q$ and 11$r$. Then, combined images 14$q$ and 14$r$ are individually displayed on the display panel 121 where the images are changed at intervals of a single frame (e.g., intervals of ⅓₀ second).

It is assumed that the user touches the display panel 121 in the above-described state at timing T1 immediately after the output of the captured image 11$r$ of the third frame period f3. Here, as illustrated in FIG. 8, it is assumed that a touch Ta is made on an image 14$f$ with an applied effect on a specified spot within the image 14$r$.

At that time, the imaging unit 170 starts the autofocus processing at timing T1 the touch is made, and the image 14F to which the same effect as that of the image 14$f$ with the applied effect is applied is generated based on an image 11$x$ that is output from the imaging unit 170 during a frame period f11 where a focus is achieved. The image 14F is stored in the memory 150 and displayed on the display panel 121.

As described above, the mobile phone terminal device 100 of the present disclosure allows plural images in which plural types of effects are applied to an image captured in a single frame to be simultaneously displayed. Therefore, the user may simultaneously confirm the images with the applied effects.

Here, the image processing unit 180 converts an image captured by the imaging unit 170 into an image of a relatively small size, such as 640 pixels in width by 480 pixels in length, and applies an effect to the image of the converted size. Therefore, even though plural types, e.g., nine types of effects are provided, processes may be simultaneously performed during individual frame periods under a relatively light load, and moving images to which the plural types of effects are applied may be suitably displayed.

Further, when a certain image included in plural displayed images with applied effects is selected based on a touch operation or the like, the mobile phone terminal device 100 performs shooting processing to store a single frame of image with an applied effect that is applied to the selected image. Accordingly, the user only has to select an image with a preferred applied effect through a touch operation or the like from among simultaneously displayed images, and the mobile phone terminal device 100 is allowed to store an image with a preferred applied effect through an operation that may be easily and intuitively performed.

Further, changing the operation state of a user allows the mobile phone terminal device 100 to store a combined image including images with plural applied effects and images with their respective applied effects, which allows storing an image in various modes.

[6. Exemplary Modifications]

In the above-described exemplary embodiment, the images with the applied nine types of effects are combined into a single image for simultaneous display. On the other hand, it may be configured that images with applied plural types of other effects are simultaneously generated, and simultaneously displayed. For example, images with applied three types of effects may be arranged and displayed by the display panel 121.

Further, specific examples of the nine types of effect processes are not limited to the above-described effect processes. Further, as effect processes that may be executed by the image processing unit 180, for example, more than nine types may be prepared and desired nine types may be selected from among those many types based on user settings.

As for the image size selected when the image processing unit 180 simultaneously performs effect processes on plural types of images, an image may be generated in a size other than 640 pixels in width by 480 pixels in length, which is exemplarily defined.

Further, when the memory 150 stores the images with the applied effects, the single frame of image is exemplarily stored according to the process of the flowchart of FIG. 7. On the other hand, moving images including plural frames of image may be provided as images that are stored in the memory 150 at the storage.

Further, in the above-described exemplary embodiment, the touch on the display panel 121 or the operation of the shutter key 141 is performed as the user operation performed to achieve the storage. On the other hand, the storage processing may be started based on a user operation other than the operation of a specific key such as the shutter key 141. For example, the switch between the storage of an image with an applied single type of effect and the storage of plural effect images may be made through a touch operation for a short time and a touch operation for a long-time. Otherwise, the control unit 160 may change the storage mode based on the detection of a touch input indicating a specific gesture.

Further, according to the above-described exemplary embodiment, an example where the configurations or the processes of the present disclosure are applied to the mobile phone terminal device 100 including the imaging unit 170 and the display unit 120 is illustrated. On the other hand, the configurations or the processes of the present disclosure may be applied to other terminal devices including an imaging unit and a display unit, such as a still camera or a video camera.

Further, according to the above-described exemplary embodiment, effects are applied to an image captured by the imaging unit 170. On the other hand, the same effect processing may be performed, for example, on an image that is externally input to the terminal device, or an image stored in the memory provided in the terminal device for display.

Further, it may be configured that a program executing the processing procedures of the present disclosure is installed in a computer so that the computer executes processing to display an image with an applied effect for a captured image or an input image. The program installed in the computer is stored in various storage mediums including an optical disk, a memory card, or the like, to be read and acquired.

Note that, the computer described herein denotes an information processing terminal to which functions may be added through the installation of application programs. The computer described herein also includes an information processing terminal such as a smartphone, a tablet terminal, or the like.

Further, the configurations or the processes that are disclosed in the claims of the present disclosure are not limited to the examples of the embodiments. It should be understood by those skilled in the art that various modifications, combinations, and other exemplary embodiments may occur depending on design and/or other factors insofar as they are within the scope of the claims or the equivalents thereof, as a matter of course.

REFERENCE SIGNS LIST

100: mobile phone terminal device, 120: display unit, 121: display panel, 130: touch panel unit, 140: operation keys, 141: shutter key, 150: memory, 160: control unit, 170: imaging unit, 171: lens, 180: image processing unit, 181: enlargement/reduction and cutting process, 182: effect process, 183: combining process, 184: enlargement/reduction process

The invention claimed is:

1. A terminal device comprising:
processing circuitry configured to:
    execute a capturing and preview mode of the terminal device to crop a captured image to generate an image having a specific number of pixels;
    apply, in the capturing and preview mode, predetermined plural types of different effects to the image;
    generate, in the capturing and preview mode, a composite image by combining plural types of image data items corresponding to the plural types of different effects and adjusting a size of the composite image to be a screen size of a display;
    display the composite image on the display in the capturing and preview mode;
    determine a storage mode among different storage modes based on a received input operation, the received input operation being a touch operation or a shutter key operation, and the different storage modes including a one-image storage mode, a multiple-image storage mode, and a combined-image storage mode; and
    store at least one of the displayed plural types of image data items based on the determined storage mode.

2. The terminal device of claim 1, wherein the composite image is a N×N matrix of the plural types of image data items.

3. The terminal device of claim 2, wherein
the display includes a touchpanel, and
the processing circuitry is configured to:
store a selected image in response to a detected touch of the selected one of the plural types of image data items displayed on the touchpanel when the determined storage mode is the one-image storage mode;
store selected multiple images of the plural types of image data items displayed on the touchpanel when the determined storage mode is the multiple-image storage mode; and
store the composite image when the determined storage mode is the combined-image storage mode.

4. The terminal device of claim 3, wherein the processing circuitry is configured to apply an effect on the captured image, the effect being a same effect as applied to the selected image, the selected multiple images or the selected composite image.

5. The terminal device of claim 2, wherein the N×N matrix is a 3×3 matrix of images.

6. The terminal device of claim 5, wherein each image in the 3×3 matrix of images was derived from the image by effect processing.

7. An image display method comprising:
executing, by processing circuitry of a terminal device, a capturing and preview mode of the terminal device to crop a captured image to generate an image having a specific number of pixels;
applying, by the processing circuitry in the capturing and preview mode, predetermined plural types of different effects to the image;
generating, by the processing circuitry in the capturing and preview mode, a composite image by combining plural types of image data items corresponding to the plural types of different effects and adjusting a size of the composite image to be a screen size of a display;
displaying the composite image on the display in the capturing and preview mode;
determining a storage mode among different storage modes based on a received input operation, the received input operation being a touch operation or a shutter key operation, and the different storage modes including a one-image storage mode, a multiple-image storage mode, and a combined-image storage mode; and
storing at least one of the displayed plural types of image data items based on the determined storage mode.

8. The method of claim 7, wherein the composite image is a N×N matrix of the plural types of image data items.

9. The method of claim 8, further comprising:
displaying the composite image on a touchpanel,
detecting a touch of the selected one of the plural types of image data items displayed on the touchpanel,
storing a selected image in response to detecting the touch of the selected one of the plural types of image data items displayed on the touchpanel when the determined storage mode is the one-image storage mode,
storing selected multiple images of the plural types of image data items displayed on the touchpanel when the determined storage mode is the multiple-image storage mode, and
storing the composite image when the determined storage mode is the combined-image storage mode.

10. The method of claim 9, further comprising:
applying an effect on the captured image, the effect being a same effect as applied to the selected image, the selected multiple images or the selected composite image.

11. The method of claim 8, wherein the N×N matrix is a 3×3 matrix of images.

12. The method of claim 11, wherein each image in the 3×3 matrix of images was derived from the image by effect processing.

13. A non-transitory computer readable medium containing a computer program recorded thereon, the computer program configured to perform a method when executed by a computer, the method comprising:
executing, by processing circuitry of the computer, a capturing and preview mode of the terminal device to crop a captured image to generate an image having a specific number of pixels;
applying, by the processing circuitry in the capturing and preview mode, predetermined plural types of different effects to the image;
generating, by the processing circuitry in the capturing and preview mode, a composite image by combining plural types of image data items corresponding to the plural types of different effects and adjusting a size of the composite image to be a screen size of a display;
displaying the composite image on the display in the capturing and preview mode;
determining a storage mode among different storage modes based on a received input operation, the received input operation being a touch operation or a shutter key operation, and the different storage modes including a one-image storage mode, a multiple-image storage mode, and a combined-image storage mode; and
storing at least one of the displayed plural types of image data items based on the determined storage mode.

14. The non-transitory computer readable medium of claim 13, wherein the composite image is a N×N matrix of the plural types of image data items.

15. The non-transitory computer readable medium of claim 13, wherein the method further includes:
displaying the composite image on a touchpanel,
detecting a touch of the selected one of the plural types of image data items displayed on the touchpanel,
storing a selected image in response to detecting the touch of the selected one of the plural types of image data items displayed on the touchpanel when the determined storage mode is the one-image storage mode,
storing selected multiple images of the plural types of image data items displayed on the touchpanel when the determined storage mode is the multiple-image storage mode, and
storing the composite image when the determined storage mode is the combined-image storage mode.

16. The non-transitory computer readable medium of claim 15, wherein the method further includes:
applying an effect on the captured image, the effect being a same effect as applied to the selected image, the selected multiple images or the selected composite image.

17. The non-transitory computer readable medium of claim 14, wherein the N×N matrix is a 3×3 matrix of images.

* * * * *